United States Patent [19]
Goddard

[11] Patent Number: 4,891,658
[45] Date of Patent: Jan. 2, 1990

[54] OPEN FRAME SIGHT VIEWFINDER

[75] Inventor: William H. Goddard, Hilton, N.Y.

[73] Assignee: Eastman Kodak Company, Rochester, N.Y.

[21] Appl. No.: 303,619

[22] Filed: Jan. 30, 1989

[51] Int. Cl.⁴ ............................................. G03B 13/04
[52] U.S. Cl. ...................................... 354/219; 33/266
[58] Field of Search .......................... 354/219; 33/266; 352/95

[56] References Cited

U.S. PATENT DOCUMENTS

| | | | |
|---|---|---|---|
| 783,665 | 2/1905 | Avril | 33/266 |
| 1,411,689 | 4/1922 | Frederick et al. | 352/95 |
| 1,423,809 | 7/1922 | Marks | 33/266 |
| 2,005,366 | 6/1935 | Gaty | 354/95 |
| 2,098,873 | 8/1936 | Kuppenbender et al. | 352/95 |
| 2,472,823 | 6/1949 | Harlon | 354/217 |
| 2,557,297 | 9/1946 | Lea | 33/266 |
| 2,624,229 | 1/1953 | Feal | 33/266 |
| 2,711,023 | 6/1955 | Nerwin | 33/266 |
| 2,806,415 | 5/1954 | Friedberg | 354/222 |
| 3,648,582 | 3/1972 | Nerwin | 354/219 |
| 4,216,589 | 8/1980 | Beaver | 33/266 |

*Primary Examiner*—A. A. Mathews
*Attorney, Agent, or Firm*—Roger A. Fields

[57] ABSTRACT

An open frame sight viewfinder for a photographic camera comprises an aiming or target ring positioned forward of a correspondingly shaped viewing aperture. The aiming ring is encircled by a relatively narrow annular zone of light rays, including the extreme rays, which pass through the viewing aperture, and it has an outer diameter which is greater than the viewing diameter of the viewing aperture. Consequently, when the camera is correctly aimed at the subject, the aiming ring appears to be concentrically located within the viewing aperture although separated from the periphery of the viewing aperture by a narrow band of ambient light. However, when the camera is incorrectly tilted relative to the subject, the aiming ring appears distorted within the viewing aperture and quickly eclipses a section of the narrow light band.

5 Claims, 2 Drawing Sheets

OPEN FRAME SIGHT VIEWFINDER

CROSS-REFERENCE TO A RELATED APPLICATION

Reference is made to commonly assigned, copending U.S. application Ser. No. 07/303,613 entitled Open Frame Sight Viewfinder, and filed Jan. 30, 1989 in the name of David C. Smart.

BACKGROUND OF THE INVENTION

1. Field of the Invention

The invention relates generally to camera viewfinders, and in particular to an open frame sight viewfinder.

2. Description of the Prior Art

When taking a picture, using a camera, it is necessary to know not only in what direction to aim the camera but also how much of the subject will be included in the picture. For this reason practically every camera has a viewfinder of some kind.

Viewfinders which are built on to or into the camera may be simple framing devices. The frame finder or open frame sight viewfinder is one of the simplest type viewfinders. It often consists of a small peep-sight and a larger frame corresponding to the shape and size of the negative. The larger frame is usually positioned forward of the small peep-sight, and they each have a common viewing axis which extends parallel to the optical axis of the taking lens. When the eye is brought close to the aperture of the peep-sight, the view bounded by the frame is almost exactly the same as seen by the taking lens. The only error is that of parallax, which is more or less negligible for subjects beyond about six feet.

Other frame finders, such as disclosed in U.S. Pat. No. 2,005,366, granted June 18, 1935, are in essence gun sights. In this instance, a small ring-shaped sight is positioned forward of a larger rear sight for viewing the small sight within the viewing aperture defined by the larger sight.

The frame finders, unfortunately, in both of the foregoing examples, do not indicate to the photographer when the camera is incorrectly tilted relative to the subject. As a result, the pictures may not turn out as intended.

THE CROSS-REFERENCED APPLICATION

One solution for solving the prior art problem described above in connection with known viewfinders is presented in the cross-referenced application. That application discloses an open frame sight viewfinder for a photographic camera, wherein an aiming ring for aiming the camera at a subject to be photographed is positioned forward of a correspondingly shaped viewing aperture to view the subject simultaneously through the ring and the aperture. The aiming ring is dimensioned to approximately encircle the extreme rays of ambient light permitted to pass through the viewing aperture. As a result, when the camera is correctly aimed at the subject, the aiming ring substantially cannot be seen in the viewing aperture. However, when the camera is incorrectly tilted relative to the subject, the aiming ring partially occludes the viewing aperture.

SUMMARY OF THE INVENTION

According to the invention, there is provided an improved open frame sight viewfinder for a photographic camera, wherein an aiming sight having an aiming aperture for aiming the camera at a subject to be photographed is positioned forward of a viewing aperture to view the aiming sight within the periphery of the viewing aperture, and wherein the improvement comprises:

said aiming sight being exteriorly dimensioned with respect to the viewing size of the viewing aperture to permit only a relatively narrow zone of ambient light to be viewed between the aiming sight and the periphery of the viewing aperture when the camera is correctly aimed at a subject to be photographed, but eclipsing a section of the narrow zone of ambient light when the camera is incorrectly tilted relative to the subject. Thus, the prior art problem described above in connection with known viewfinders is solved by an improved viewfinder which indicates whether or not the camera is correctly tilted relative to the subject.

DETAILED DESCRIPTION OF THE PREFERRED EMBODIMENT

The invention is disclosed as being embodied preferably in a 35mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
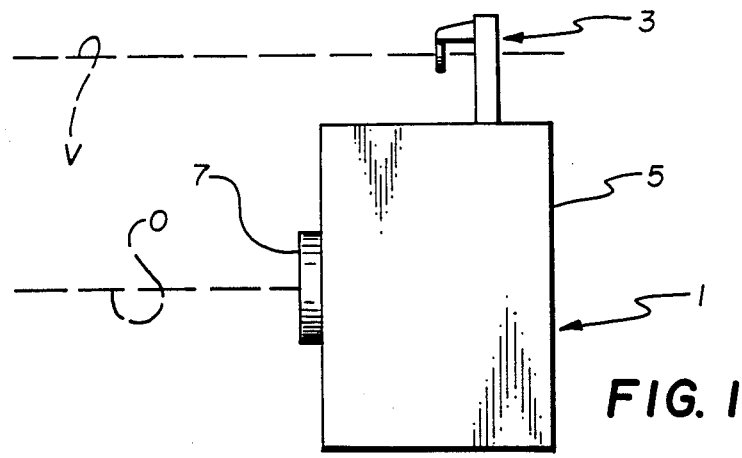
FIG. 1 is a side elevation view of a camera including an improved viewfinder according to a preferred embodiment of the invention.

Referring now to the drawings, FIG. 1 shows a 35mm still camera 1 including an open frame sight viewfinder 3 according to a preferred embodiment of the invention. The viewfinder 3 is pivotally mounted on top of the camera body 5 for movement between the illustrated erect position and a folded or flat position, not shown, against the camera body. When the viewfinder 3 is in the erect position, its viewing axis V extends parallel to the optical axis O of the camera lens 7.

Figure 2:
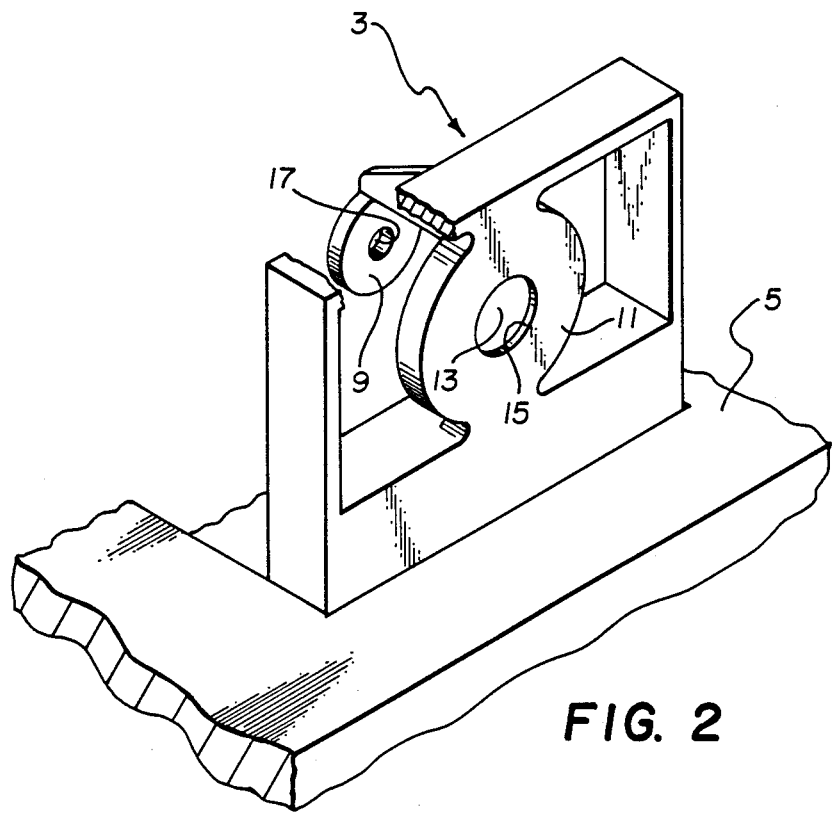
FIG. 2 is a rear perspective view of the improved viewfinder.
Figure 3:
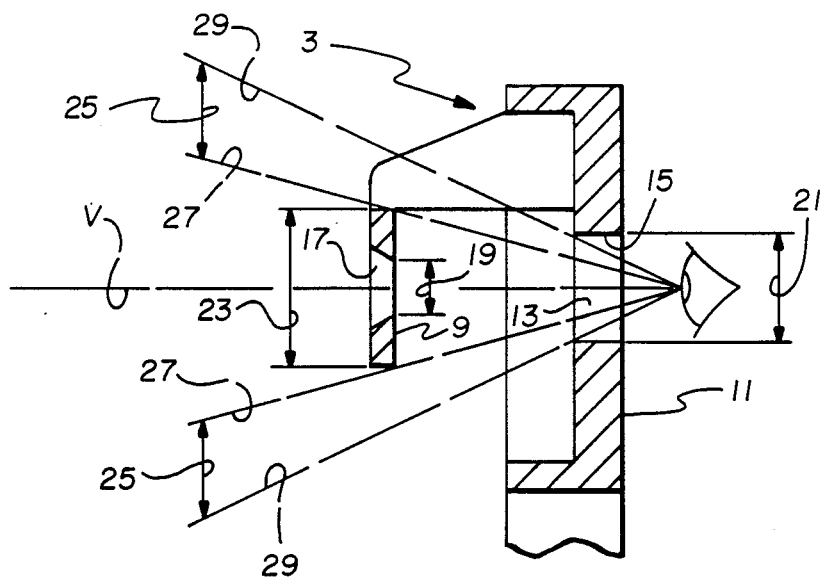
FIG. 3 is a side sectional view of the improved viewfinder, showing the ray path of ambient light of the eye.

As shown in FIGS. 2 and 3, the viewfinder 3 comprises a small aiming or target ring 9 positioned forward of a larger rear-sight ring 11. The rear-sight ring 11 has a central viewing aperture 13 for viewing the aiming ring 9 concentrically within the periphery 15 of the viewing aperture. The central viewing aperture 13 of the rear-sight ring 11 and a central aiming aperture 17 of the aiming ring 9 are each centered about the viewing axis V. The effective inner diameter 19 of the aiming ring 9 is less than the viewing diameter 21 of the viewing aperture 13.

Figure 4:
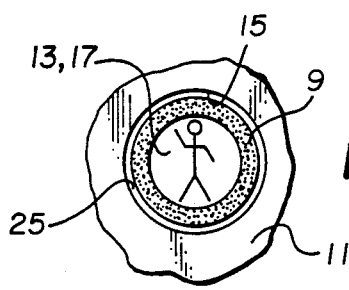
FIG. 4 is a rear elevation view of the improved viewfinder, indicating the eye view through the viewfinder when the camera is correctly tilted relative to the subject.
Figure 5A:
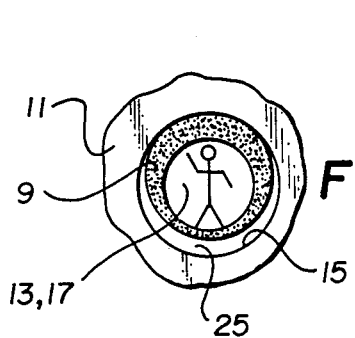
FIGS. 5a, 5b, 5c, and 5d are rear elevation views similar to FIG. 4, indicating the respective eye views through the viewfinder when the camera is incorrectly tilted up, down, left, and right relative to the subject.
Figure 5B:
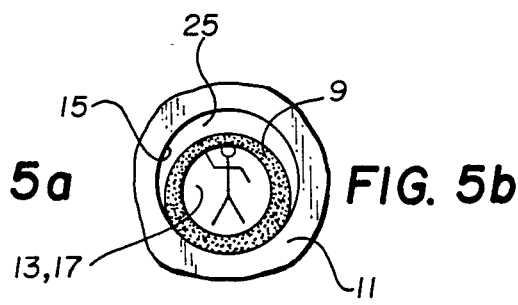
Figure 5C:
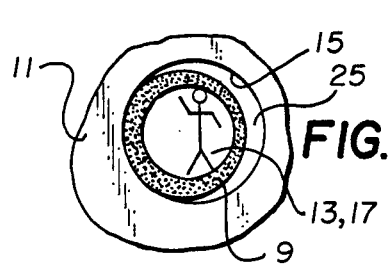
Figure 5D:
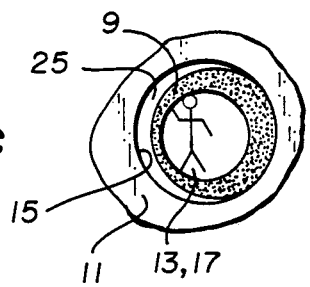

The aiming ring 9 has an outer diameter 23 which is slightly greater than the viewing diameter 21 of the viewing aperture 13. This relation permits only a relatively narrow annular zone 25 of ambient light to be viewed between the aiming ring 9 and the periphery 15 of the viewing aperture 13 when the camera lens 7 is correctly aimed at a subject to be photographed. See FIGS. 3 and 4. The annular zone 25 of ambient light is bounded on one side by an array of inner light rays 27 and on the other side by a concentric array of extreme rays 29, both of which pass through the viewing aperture 13 and also encircle the aiming ring 9.

OPERATION

When the camera lens 7 is correctly aimed at the subject to be photographed, the aiming ring 9 appears to be concentrically located within the viewing aperture 13 although separated from the periphery 15 of the viewing aperture by the annular zone 25 of ambient light. See FIG. 4. However, when the camera lens 7 is incorrectly tilted up, down, left, or right relative to the subject, the aiming ring 9 appears distorted within the viewing aperture 13 and quickly eclipses a section of the annular zone 25 of ambient light. See FIGS. 5a, 5b, 5c, and 5d, respectively.

The invention has been described with reference to a preferred embodiment. However, it will be appreciated that variations and modifications can be effected within the ordinary skill in the art without departing from the scope of the invention. For example, the aiming ring 9 and the rear-sight ring 11 instead of being ring-shaped could be rectangular-shaped to correspond in size and shape to a negative.

I claim:

1. An improved open frame sight viewfinder for a photographic camera, wherein an aiming sight having an aiming aperture for aiming the camera at a subject to be photographed is positioned forward of a viewing aperture to view said aiming sight within the periphery of said viewing aperture, and wherein the improvement comprises:
   said aiming sight being exteriorly dimensioned to be dimensionally greater than the viewing size of said viewing aperture to permit only a relatively narrow zone of ambient light to be viewed between the aiming sight and said periphery of the viewing aperture when the camera is correctly aimed at a subject to be photographed, but eclipsing a section of said narrow zone of ambient light when the camera is incorrectly tilted relative to the subject.

2. The improvement as recited in claim 1, wherein said narrow zone of ambient light is bounded outwardly by extreme light rays which pass through said viewing aperture.

3. The improvement as recited in claim 1, wherein said aiming aperture of the aiming sight has a viewing size which is less than the viewing size of said viewing aperture.

4. An improved open frame sight viewfinder for a photographic camera, wherein an aiming ring is positioned forward of a viewing aperture for viewing said ring within the periphery of said aperture, and wherein the improvement comprises:
   said aiming ring having an outer diameter which is greater than a viewing diameter of said viewing aperture to permit only a relatively narrow annular zone of ambient light to be viewed between the aiming ring and said periphery of the viewing aperture when the camera is correctly aimed at a subject to be photographed, but eclipsing a section of said annular zone of ambient light when the camera is incorrectly tilted relative to the subject.

5. An improved open frame sight viewfinder for a photographic camera, wherein an aiming ring is positioned forward of a correspondingly shaped viewing aperture for viewing said ring concentrically within the periphery of said aperture, and wherein the improvement comprises:
   said aiming ring having an outer diameter which is slightly greater than a viewing diameter of said viewing aperture to permit only a relatively narrow annular zone of ambient light to be viewed between the aiming ring and said periphery of the viewing aperture when the camera is correctly aimed at a subject to be photographed, to give the appearance that the aiming ring is concentrically located within the viewing aperture, but eclipsing a section of said annular zone of ambient light when the camera is incorrectly tilted relative to the subject, to give the appearance that the aiming ring is distorted within the viewing aperture.

* * * * *